Figure 1:
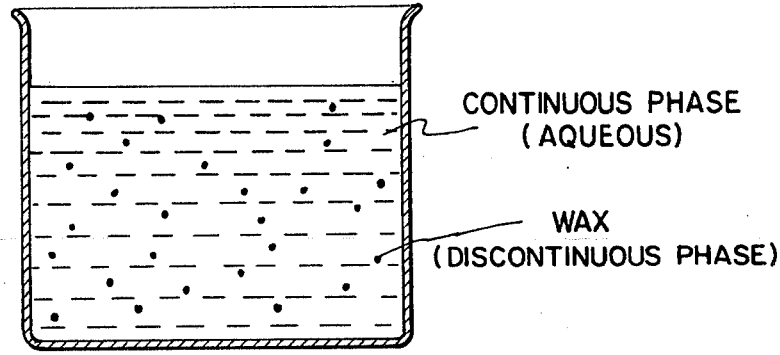

United States Patent [19]

Liebowitz et al.

[11] 4,013,475
[45] Mar. 22, 1977

[54] POLISH

[75] Inventors: Marvin Liebowitz, Edison; Eugene Howard Brandli, Somerset, both of N.J.

[73] Assignee: Colgate-Palmolive Company, New York, N.Y.

[22] Filed: Sept. 27, 1974

[21] Appl. No.: 510,033

[52] U.S. Cl. ................................. 106/10; 106/11; 106/271; 252/309

[51] Int. Cl.² ........................................ C09G 1/12

[58] Field of Search ................. 106/10, 3, 11, 271; 252/309

[56] References Cited

UNITED STATES PATENTS

| 3,393,078 | 7/1968 | Lockhart et al. | 106/11 |
| 3,395,028 | 7/1968 | Mackles | 106/10 |
| 3,442,676 | 5/1969 | Belfort | 106/271 |
| 3,519,562 | 7/1970 | Lanner | 106/271 |
| 3,847,622 | 11/1974 | Brandl et al. | 106/10 |

Primary Examiner—Lorenzo B. Hayes
Attorney, Agent, or Firm—B. Norman Blumenkopf; Murray M. Grill; Herbert S. Sylvester

[57] ABSTRACT

Wax polishing compositions in the form of a double emulsion wherein the continuous phase comprises organic solvent, organopolysiloxane and water-in-oil emulsifier and the discontinuous phase comprises aqueous particles having dispersed particles of wax therein. Compositions are prepared by adding at room temperature an aqueous media containing emulsified wax to a solvent solution containing organopolysiloxane and water-in-oil emulsifier, also at room temperature.

21 Claims, 3 Drawing Figures

WAX EMULSION (OIL IN WATER EMULSION)

WAX EMULSION (OIL IN WATER EMULSION)

FINISHED DOUBLE EMULSION

STANDARD WAX EMULSION

POLISH

This invention relates to a novel process for preparing a water-in-oil "double emulsion" useful for treating hard surfaces as well as the composition produced thereby.

Presently known methods for preparing socalled "wax-polishing" compositions of the water-in-oil type entail significant disadvantages, including for example, the requirement for using and thus handling organic solvent solutions at high temperatures as well as the necessity for using hot aqueous media in the final emulsion-forming step. Generally, the heated aqueous solution is added to the oil or solvent phase portion in which all oil phase ingredients, e.g., mineral oil, silicone oil, wax and the like, have been previously dissolved or dispersed. As will be recognized, excessive heating and cooling periods are invariably necessary as is the use of costly heat transfer equipment to accelerate heat dissipation, and supply. Moreover, the risk to both personnel and equipment due to difficulties associated with the handling of hot organic solvent solutions is self-evident. Furthermore, loss of costly organic solvent through evaporation is usually unavoidable as a practical matter.

In addition, the emulsion compositions produced by such processing are often inferior and, particularly, from the standpoint of wax emulsion particle size. Thus, emulsion polish compositions having an undesirably large particle size often produce inferior luster, gloss, hardness, durability, wipe-up rate and wetting and spreading characteristics, as well as exhibiting a pronounced tendency to smear when applied to hard surfaces such as metal, wood, and finished wood, particularly the latter. This is probably due to the tendency of the wax particles to agglomerate when spread over the surface being treated and thus the possibility of laying down a continuous, high quality wax film is minimal. Additionally, it is found in practice that the more coarsely grained emulsions, i.e., having relatively large particle size, tend to cause clogging problems in the discharge orifice of aerosol dispenser containers, and thus substantially complete expulsion of container ingredients is often unattainable. Consumer acceptance of such products is quite obviously adversely affected. Further, where the wax is present in the oil phase, there is a pronounced tendency for the wax particles to agglomerate, particularly upon standing, and this too creates clogging problems.

In order to remedy the foregoing, a wide variety of techniques have been promulgated in the art which focus both on the composition and the process. However, any improvement obtained, is often of only marginal significance. The use of silicones of diverse types, i.e., organopolysiloxanes, although beneficial from the standpoint of luster, gloss, durability, etc., nevertheless fails to provide appreciable mitigation of the agglomeration and smear problems, the latter often referred to as "streak" or "bronze". Moreover, such compositions are quite often inferior as regards protective qualities and dust resistance and require relatively vigorous modes of application in order to obtain a protective film of good quality.

In accordance with the present invention, a process for preparing hard surface treating compositions of the water-in-oil emulsion type is provided, the emulsion composition produced thereby having a more uniform and relatively smaller average particle size, thus being substantially devoid of the manifold disadvantages inherent in coarse-grained emulsion compositions.

In a further aspect, the present invention provides water-in-oil "double emulsion" compositions useful for treating hard surfaces and wherein the advantageous properties made possible by the process used in their preparation are not only significantly enhanced but supplemented as well by virtue of controlling both the type and quantity of ingredients employed.

Thus, a primary object of the present invention is to provide a process for preparing a water-in-oil double emulsion composition useful for treating hard surfaces wherein the foregoing and related disadvantages are eliminated or substantially reduced.

Another object of the present invention is to provide a water-in-oil double emulsion composition substantially devoid of any tendency to agglomerate and particularly insofar as wax coagulation is concerned.

A further object of the present invention is to provide such a process wherein requirements with respect to heating, cooling and hot solvent handling are greatly minimized.

A still further object of the present invention is to provide such a process wherein the water-in-oil "double emulsion" produced thereby has a uniform and comparatively small average particle size and particularly with respect to the dispersed wax phase.

Another object of the present invention is to provide water-in-oil emulsion compositions substantially devoid of any tendency to smear or streak and which can be applied with a minimum of physical effort to a variety of hard surfaces whereby to produce a high quality continuous film.

Yet another object of the present invention is to provide a water-in-oil emulsion composition having excellent spreading and wetting characteristics which when applied to a hard surface can be easily buffed to produce a coating having improved dust resistance, gloss, luster, durability, wipe up, hardness, lubricity and resistance to environmental effects e.g., heat, humidity, radiation, etc.

Other objects and advantages will become apparent as the description proceeds.

The foregoing and related objects are obtained in accordance with the present invention which in its broader aspects provides a process for the preparation of a stable water-in-oil double emulsion useful for treating hard surfaces which comprises intimately mixing:

A. a homogeneous organic solvent solution comprising
  (1) from about 0.05 to 9% of organopolysiloxane having a viscosity of from about 20 to 15,000 centistokes,
  2. from about 5 to 50% of organic solvent preferably having an aniline point of from about −22 to 185° F and a distillation range of from about 190° to 460° F, said solvent being substantially completely miscible with said organopolysiloxane, and
  3. an effective amount of water-in-oil emulsifier, e.g., .25 to 8.0%, preferably 0.5 to 5% and most preferably 1–3% being based upon the final product composition
with
B. an oil-in-water emulsion composition comprising as the oil phase, wax particle having a particle size from about 0.1 to 5 $\mu$ uniformly dispersed throughout a continuous aqueous phase, the concentration of wax in said emulsion being from about 1 to 50% by weight, whereby to form a water-in-oil emulsion composition wherein (A) forms the continuous phase and (B) forms the discontinuous phase, the latter comprising aqueous macroscopic particles said wax uniformly dispersed therein and wherein the proportions of (A) and (B) are such as to provide a total wax concentration in the final product from about 0.1 to 5% by weight.

In accordance with a highly preferred embodiment, emulsion polish compositions having a particularly high resistance to smearing are provided when the organopolysiloxane comprises a mixture of (a) organopolysiloxane having a viscosity at 25° C. of from about 50 to 550 centistokes and (b) organopolysiloxane having a viscosity at 25° C. of from about 950 to 15,000 centistokes, and wherein at least 50% but preferably at least 70% of the organic solvent comprises an isoparaffinic hydrocarbon solvent having an initial boiling point of 190°–210° F. Thus, compliance with the aforedescribed requirements insures that the resultant composition be truly uniquely devoid of any tendency to smear or agglomerate yet capable of producing, when applied to a hard surface, a high gloss film possessed of excelldust resistance and resistance to environmental effects with a minimum of physical effort required for buffing.

Perhaps the most valuable feature of the aforedescribed process, however, is the unusually fine particle size characterizing the aqueous or dispersed phase in the final "double emulsion" composition. Thus, the particle size of the wax component in the final emulsion has been found to be undetectable despite 900 × magnification. The exceptionally fine grain character of the wax emulsion provides a number of important advantages such as high gloss with minimum buffing, the practical elimination of "streaking" or "bronzing", excellent dust resistance protective qualities, wipe up and the like. Of utmost importance is the substantial mitigation of the wax agglomeration problem; thus, compositions prepared as described exhibit negligible tendency to cause clogging problems in the discharge orifice of aeorosol containers as repeated testing indicates thereby enabling substantially complete exhaustion of container contents.

In order to avoid confusion, the initial oil in water emulsion composition hereinbefore identified as composition (B) will also hereinafter be referred to as the "wax emulsion" to distinguish same from the final product water-in-oil emulsion.

Figure 2:
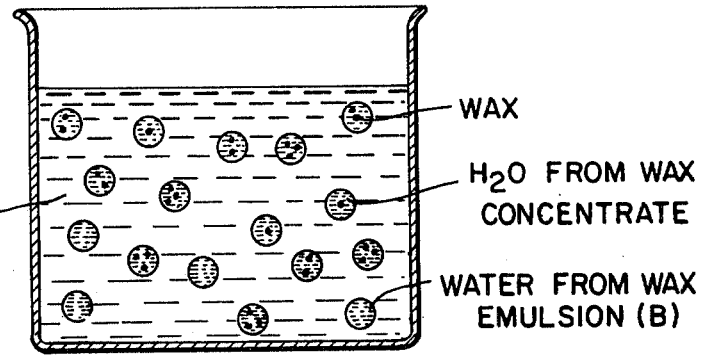
Figure 3:
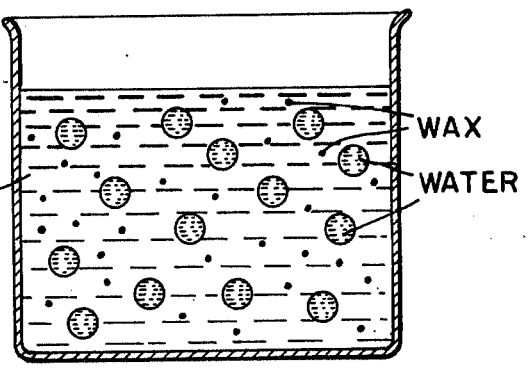

The "double emulsion" described herein can perhaps best be explained by reference to the accompanying drawing wherein FIG. 1 illustrates wax emulsion composition (B) containing uniformly dispersed wax particles in a continuous aqueous phase as represented. FIG. 2 illustrates the final product double emulsion, i.e., wax emulsion (B) uniformly dispersed as emulsified particles throughout a continuous oil phase, composition (A). As illustrated in FIG. 2 a portion of the dispersed aqueous particles will be devoid of wax, this being the aqueous component of the solvent phase composition (A). FIG. 3 illustrates wax emulsion composition of the type presently available commercially wherein the wax and aqueous components are present as distinct and separate discontinuous phases dispersed in a continuous oil phase comprising solvent, silicone oil, etc. Such products are usually prepared by including the wax in the continuous oil phase composition prior to emulsion formation with hydrophilic components.

Wax emulsion composition (B) as described herein can be simply prepared by mixing the aqueous and wax components and suitable oil-in-water emulsifier at elevated temperature; it is usually desirable to add the aqueous medium to the mass of molten wax, the point of water addition being below the wax level. This avoids splattering, the formation of localized hot spots etc. and promotes conditions of turbulence conducive to efficient mixing and wax emulsion formation. In general, the wax and emulsifier are melted by heating to a temperature above its melting point, e.g., 150° to 250° F. in a jacketed tank; for better results, the bottom dish of the tank should also be jacketed. After the wax is melted and the temperature reaches about 200° F. (e.g. for Carnauba wax) the aqueous medium, heated to a temperature of about 170° to 210° F., preferably about 200° F. is added in the manner described i.e., by suitable downspout. The aqueous medium may be simply water, or water containing other soluble or dispersible ingredients such as surfactant, abrasive etc., to be described in greater detail hereinafter. When water addition is completed, the heat source is isolated and the emulsion medium is allowed to cool. It is usually desirable to delay the addition of other ingredients, such as preservative until substantial cooling is effected i.e., the temperature of the wax emulsion is of the order of 90° F. The emulsion medium is allowed to cool to room temperature. For best results, agitation should be supplied continuously throughout the procedure described in order to supply the desired shear forces to the involved ingredients. If desired, the emulsion composition may be further size reduced using conventional triturating means such as an homogenizer.

Solvent phase (A) can be simply prepared by mixing solvent, water-in-oil emulsifier and silicone at room temperature within the proportions hereinbefore given. Again, it is usually desirable to supply continuous agitation in preparing the solvent phase to assure formation of a homogeneous solution.

The final emulsion is prepared by mixing was emulsion (B) and solvent composition (A) at room temperature while maintaining continuous agitation. It is generally preferable to add the wax emulsion to the solvent composition, this particular order of addition being found to provide particularly good results. It should be emphasized that the requisite mixing can be accomplished at room temperature there being no necessity for elevated temperature. Apart from the advantages previously mentioned as regards handling, safety, evaporation losses and the like, it will be readily apparent that volatile ingredients such as perfume and the like may be added prior to or during final emulsion preparation. This is to be contrasted with conventional processing involving the use of hot solvent media and wherein the addition of volatile ingredients must be delayed until final cooling is effected. Thus, in the instant invention, there is no necessity for adding volatile ingredients as a separate postemulsification step.

The relative proportions of compositions A and B may vary over a relatively wide range. In general however, it is recommended that such proportions be selected so as to provide a concentration of wax in the final double emulsion within the range of from about 0.1 to 5% by weight.

The water-in-oil double emulsion composition thus obtained has an average particle size within the range of about 0.1 to about 5 microns and preferably 0.1 to about 2 microns and most preferably 0.1 to 1 micron as compared to prior art water-in-oil emulsion polishing compositions which typically have an average particle size within the range of 10 to 50 microns. The latter "coarse-grained" emulsions are markedly inferior, and particularly, with respect to smearing tendency.

The water-in-oil emulsions hereinbefore described as comprising a particularly valuable aspect of the present invention have the following composition:

A. from about 0.05 to 9% of organopolysiloxane blend of (1) organopolysiloxane having a viscosity at 25° C of from about 50 to 550 centistokes and (2) organopolysiloxanes having a viscosity at 25° C of from about 950 to 15,000 centistokes, B. from about 5 to 50% of organic solvent having an aniline point of from about −22 to 185° F and a distillation range of from about 190° F to 460° F, said solvent being substantially completely miscible with said organopolysiloxane, and wherein at least about 50% and preferably at least 70% of said solvent comprises isoparaffinic hydrocarbon solvent having an initial boiling point of 190°–210° F, C. an effective amount, i.e. about 0.25 to 8% of water-in-oil emulsifier, D. from about 0.1 to 5% of wax, E. the balance water, and other formula ingredients i.e. fragrance, preservative etc., all percentages being by weight based on total composition.

The organopolysiloxanes or "silicones" utilizable herein are known materials and have long been recognized as valuable adjuvants in hard surface-treating compositions. These materials which are normally liquids, facilitate application of the composition to a surface whereby to obtain a lustrous film by simple buffing. Specific examples include, without necessary limitation, dimethyl polysiloxane, diethyl polysiloxane, diphenyl polysiloxane, mixed alkyl polysiloxanes such as methyl-ethyl polysiloxane, block copolymers of organopolysiloxane with, for example, oxyalkylene and the like. Suitable organopolysiloxanes have a viscosity at 25° C of from about 20 to 15,000 centistokes. Silicones having a viscosity lower than 20 centistokes are usually too volatile and thus durable films are difficult to obtain. Silicones having a viscosity substantially in excess of 15,000 centistokes provide films which are difficult to buff. Certain silicones ie., dimethyl polysiloxane are criticized because of their tendency in some instances to agglomerate when spread on a surface and the fact that they are removable only with difficulty from a wood surface being prepared for refinishing, leading to spotting and pitting in a subsequently applied lacquer layer. However, such disadvantages are substantially ameliorated by the present invention, due in large part to the fine grain character of the emulsified wax phase.

In accordance with a highly refined embodiment, the silicone used comprises a mixture of silicones comprising (1) an organopolysiloxane having a viscosity at 25° C of from about 50 to 550 centistokes and (2) an organopolysiloxane having a viscosity at 25° C of from about 950 to 15,000 centistokes. The relative quantities of (1) and (2) in the mixture may vary but for optimum results, the weight ratio of (1) to (2) should range from about 2:1 to 1:3. Suitable silicones include, for example a blend of the dimethyl polysiloxanes available under the Tradename designation G.E. Silicone SF-96 in the aforementioned desired viscosity ranges.

The advantages of the aforedescribed silicone mixture can be explained as follows: It might normally be expected that similar results would obtain should the aforedescribed blend of silicones be replaced with an equivalent amount of a silicone having a viscosity approximating the average value of the silicone blend. However, such is not the case as experimental investigation indicates particularly effective reduction of the smear problem and concurrent enhancement of gloss in particular to obtain with the use of the specific silicone blend described.

The silicone material is employed in amounts ranging from about 0.05 to 9% by weight of product double emulsion. For example, trimethyl polysiloxanes is found to enhance resistance of the composition to dust collection and environmental effects while blends of amine functional silicones are found to be particularly effective when the emulsion product is designed for treating metal surfaces, i.e., automobiles, in order to promote resistance to detergents.

The organic solvents suitable for use in preparing the oil phase portion (A) may be selected from a wide variety of materials. In general, suitable solvents have an aniline point of from about −22° to 185° F. with a range of 50° to 185° F. being preferred, and a distillation range of from about 190° to 460° F. Aniline points and distillation ranges are determined in accordance with the procedure prescribed by the American Society for Testing Materials. Representative solvents include, without necessary limitation, hydrocarbons, and particularly isoparaffinic hydrocarbons having an initial boiling point of 190° to 210° F. i.e. naphtha, "Stoddard" solvent, chloro-substituted hydrocarbons such as carbon tetrachloride, ethylene dichloride, perchloroethylene and trichloroethylene, hydrocarbon ethers such as ethyl, hexyl or methyl ethers.

Other suitable solvents include: the aromatic solvents such as benzene, toluene, xylene, decatin, tetralin and hexalin.

Also suitable are: kerosene, wood turpentine, gum turpentine, pine oil and dipentene. The "distillation range" criterion described previously is particularly applicable to petroleum distillate solvents. Thus, below the distillation range given, it is found that vapor pressure is excessively high and loss of solvent through volatilization during application of the emulsion composition to a surface seriously impairs emulsion covering and spreading capacity. If the distillation range is too high, drying of the applied emulsion is retarded to the extent that excessive buffing is required to achieve the desired uniform film.

Other suitable ingredients for the oil phase particularly useful for wood polishing compositions include oils of animal, vegetable or mineral origin and may be employed in amounts ranging from about 0.1 to 5.0% based on final composition. Examples include without necessary limitation, white mineral oil, caster oil, linseed oil, safflower oil, spindle oil, sperm oil, etc.

In accordance with a preferred embodiment, it is found that synergistic enhancement of the smear resistant property in particular obtains when at least about 50% of the total solvent present comprises an isoparaffinic hydrocarbon solvent having an initial boiling point of 190°–210° F. Generally, such solvent contains from 6 to 8 carbon atoms and may be employed singly or in admixture. Particularly effective solvents include, for example, a hydrocarbon mixture of isoparaffinic hydrocarbons consisting principally of $C_8$ isomers such as Isopar C (flash point of less than 40° F) available commercially from the Exxon Corporation.

For effective results, the total solvent should comprise from about 5 to 50%, and preferably 15 to 35% by weight of total emulsion composition in order to achieve an effective balance as between the properties imparted by the solvent and water phases respectively. Thus, excess solvent tends to render the emulsion product overly non-polar thereby diminishing the effectiveness of the water phase, i.e., ability to remove water-soluble-type stains. Similar results obtain if the aqueous portion of the composition is present in undue excess, i.e., spotting, smearing, etc. may result in the film applied to a surface in use and the ability to remove solvent-soluble stains is diminished.

The water-in-oil emulsifiers suitable for use herein in forming the final double emulsion may be selected from a wide variety of materials well known in the art.

In general, suitable water-in-oil emulsifiers are those having HLB values in the range of about 3 to 6, and preferably 4 to 6 as described in "The Atlas HLB System" (4th printing) copyright 1963 by Atlas Chemical Industries, Inc. As illustrated emulsifiers are the following:

A. Sorbitan Fatty Acid esters, e.g.
  laurate (Arlacel 20 or Span 20)
  palmitate (Arlacel 40 or Span 40)
  stearate (Arlacel 60 or Span 60)
  tristearate (Arlacel 65 or Span 65)
  Sesquioleate (Arlacel 83)-1500 cs
  sesquioleate (Arlacel C)-1000 cs.
B. Polyoxyethylene alcohols e.g.
  Brij 52 — cetyl alcohol + 2 moles Ethylene oxide (E.O.)
  Brij 72 — stearyl alcohol + 2 E.O.
  Brij 92 — oleyl alcohol + 2 E.O.
C. Mono & Diglycerides
  Atmos 150 (palmitate - stearate)
  Atmul 124 (Stearate)
  Atmul 500 (Stearate-oleate)
  Atmul 200 (lacto-palmitate)
D. Polyoxyethylene sorbitol esters
  G-1702 beeswax
  G-1726 beeswax Effective amounts of emulsifier are used, i.e., amounts sufficient to adequately disperse the wax emulsion in the oil or solvent phase as well as to provide the requisite emulsion stability on storage. In general, these amounts will range from about 0.25 to 8% by weight of total product composition. Another of the many advantages characterizing the present invention resides in the fact that the quantity of emulsifier used may be considerably higher than is customary without detrimental effects. Thus, it is often found that the presence of emulsifiers tends to reduce gloss and promote smear and thus their use was limited. In fact, the total elimination of emulsifier is considered desirable in much of the prior art. However, the present invention removes the limitations on emulsifier use and thus significant quantities thereof may be used without attendant deleterious effects upon emulsion properties and particularly smear resistance.

Suitable oil-in-water emulsifiers used in forming the wax emulsion are likewise well known in the art and include without necessary limitation, those having HLB values, as hereinbefore defined, in the range of about 8 to 18. Illustrative products are:

A. Polyoxyethylene Sorbitan Fatty Esters
  Tween 60 (stearate with 20 moles ethylene oxide)
  Tween 80 (oleate with 20 E.O.)
  Tween 81 (oleate with 5 E.O.)
B. Polyoxyethylene acids
  Myrj 52 (stearate with 40 E.O.)
  Renex 20
C. Polyoxyethylene alcohols
  Brij 35 (lauryl with 23 E.O.)
  Brij 58 (cetyl with 20 E.O.)
  Brij 78 (stearyl with 20 E.O.)
  Renex 30 (tridecyl with 12 E.O.)
  Renex 31 (tridecyl with 15 E.O.)
D. Amine and Alkanolamine soaps
  diethanolammonium stearate
  monethanolammonium laurate
  morpholinium oleate
E. Alkyl aryl sulfonates
  G-3300 (Atlas)

It is of course also understood that blends of emulsifiers of varying HLB values can be used to obtain products of desired HLB values which are determinable in the manner described in the aforecited Atlas Chemical Industries, Inc. Publication.

The amount of oil-in-water emulsifier in the wax emulsion may range from about 0.5 to 25% preferably 1 to 15% and most preferably 2 to 8%. In the finished double emulsions of this invention, the oil-in-water emulsifier may range from about 0.05 to 2.5% preferably 0.1 to 1.5% and most preferably, 0.2 to 0.8% by weight of the total emulsion system.

The wax materials for use herein which may be of animal, vegitable or mineral origin, are also known in the art and may be selected from a wide variety of substances. As is well known, wax in its dispersed form, like the silicone, facilitates application of the emulsion to a surface to obtain a uniform film having good gloss and water resistance. Additionally, the wax tends to reduce water spotting and increase the depth of gloss. Examples, include, without linitation, paraffin wax, eg., microcrystalline and oxidized paraffins, montan wax, ozokerite, vegetable wax eg., carnauba wax, candellila, ouricury, palm wax and the like, animal wax such as beeswax, whale wax and the like, synthetic wax. The preferred waxes in general have a melting point of from about 120° to 230° F and are usually at least partly soluble in aliphatic hydrocarbon solvents and insoluble in lower molecular weight alcohols. Other desirable characteristics include good film forming capacity and water resistance. Particularly preferred for use herein are the montan waxes and carnauba wax. The montan wax may further contain ester groups obtained by esterifying at least part of the acid groups of the wax with, for example, a polyhydric alcohol or $C_{16}$ to $C_{30}$ monohydric alcohol. Suitable montan ester waxes are those commercially available under the Tradename designations Hoechst wax E, F and OP (American Hoechst Co.). The melting point ranges for these materials are respectively 169° to 178° F, 162° to 171° F and 212° to 221° F; the acid values are respectively 15 to 20, 6 to 10 and 10 to 15; the saponification values are respectively 140 to 160, 95 to 105 and 100 to 115.

The amount of wax used ranges from about 0.1 to 5% by weight of final double emulsion. Wax quantities below the prescribed minimum are usually insufficient to provide the desired gloss leading to a deposited layer which is non-uniform in gloss and bearing high and low gloss streaks. If the maximum amount prescribed is exceeded, the buffing of the applied film becomes difficult. The wax quantities prescribed for use herein are significantly lower than those customarily employed in much of the prior art. In general it is considered that relatively high quantities of wax are necessary to minimize smearing as well as other surface impairing visual effects. Again, however, the present invention makes possible the effective use of relatively lower quantities of wax in the virtual absence of the smear and streak phenomena. The preferred montan ester wax and carnauba wax are employed in amounts sufficient to yield a weight ratio of the former to the latter in the range of about 2:1 to 1:2.

The amount of water present in the final double emulsion composition ranges from about 50 to 84% by weight of composition. Water is essential from a number of standpoints. Thus, many of the stains encountered in treating lacquered wood surfaces are hydrophilic in nature and thus the use of organic solvent alone would be ineffective. In this regard, the water serves as a cleaning agent. It is also important to note that significantly large quantities of water may be employed in the present invention. Ordinarily it would be expected that large amounts of water would tend to impair emulsion stability and cause perhaps deemulsification. This would in turn be expected to lead ultimately to substantial smearing and other defects in the applied film producing a wholly unsatisfactory appearance. However, such is not the case in the present invention. Thus, it has been found, that not only are the manifold advantages inherent in the use of water realized to an outstanding extent but, additionally the normally expected attendant disadvantages are substantially, if not completely avoided.

Other ingredients which may be employed in the composition and process of the present invention include without limitation perfumes, stabilizers, ultra violet absorbers (0.02–0.5%), optical brighteners (0.02–5%), amine functional silicones to promote detergent resistance in the applied film (0.2–2.0%), water soluble synthetic organic detergents eg., anionic, nonionic, cationic, amphoteric and zwitterionec surfactants, soaps, long chain fatty amines (0.5–3%), antistatic agents (0.03–1%), was dispersants (0.05–5%), dust repellent (0.05–0.5%), fluoropolymers (0.05–0.5%), etc.

Perfumes are added to impart a pleasant fragrance and particularly in treating wood surfaces eg., furniture, wood panels and the like. Suitable perfumes are well known in the art and need not be described in detail here. Typically, perfumes are of complex chemistry and thus are often designated solely in terms of fragrance. Lemon oil fragrance is particularly suitable for use herein. The amount of perfume is small and may range from the effective amount necessary to impart the desired intensity of fragrance, eg. about 0.05% by weight of composition up to about 1%.

Stabilizers may be employed in amounts ranging from a small but effective stabilizing amount eg. about 0.02% up to about 0.5% by weight of total composition. Emulsion stabilizers are well known in the art and include without limitation, triethanolamine lauryl sulfate, polyacrylic acid, carboxymethylcellulose and the alkyl phenyl ethers of polyoxyalkylene glycols, water insoluble soaps and the like. The latter, in addition to stabilizing the composition so that it can be stored indefinitely and under diverse conditions without phase mixing ie., de-emulsification, further acts as dispersing agents in preventing coagulation of waxes into globules of significant size during manufacture. Soaps of this type include aluminum stearate, aluminum palmitate and the like.

Suitable organic detergents include, without limitation those of the nonionic type such as polyoxyethylene esters of fatty acids, the polyoxyethylene glycol esters of fatty acids, the polyoxyethylene sorbitan esters of fatty acids, the fatty amine condensates, the sorbitan fatty esters, the propylene glycol esters of fatty acids, the alkyl aryl polyether alcohols and the organic phosphate esters. Surface active agents of the anionic type which are similarly of particular value in these emulsions are the salts of fatty acids, the salts of alkyl aryl sulfonates, the salts of the fatty alcohol sulfates, the salts of the alkyl aryl polyether sulfonates, the salts of the sarcosinates and protein condensates.

Yet additional ingredients may included in order to achieve special effects. Thus, dye stain or pigment may be included when finishing raw wood or refinishing previously stained and lacquered surfaces. Finely divided mild abrasive may be added (included, for example, as an ingredient of the aqueous (wax emulsion) phase portion prior to blending with the solvent phase) in amounts ranging from about 0.25 to 2.0% by weight of final composition. Preferably, the abrasive is a kaolin type aluminum silicate abrasive. However, other mild abrasives may be used which are not harmful to the surface being treated. Thus, when preparing a paste-type car polish, the abrasive is preferably an oleophilic type which would be mixed with the solvent phase portion prior to blending with the aqueous wax emulsion phase portion. When preparing a liquid car polish, the abrasive is preferably introduced into the composition as a hydrophilic dry powder. Other suitable abrasives include, without limitation, finely divided clay, diatomaceous earth, pumice and the like.

The water-in-oil double emulsion compositions of the present invention may be prepared in a wide range of viscosities ie., from a thick semi-solid viscous paste to a relatively nonviscous liquid. Composition consistency can be controlled, for example, by merely regulating the relative quantities of water, wax and organic solvent in the final double emulsion as is well known in the art. Aerosol application obviously requires the use of low viscosity liquid forms of the composition.

In accordance with a particularly valuable embodiment of the invention, the composition is provided in aerosol form. This may be readily accomplished merely by adding the emulsion composition to an aerosol container which is then capped with an aerosol valve. Thereafter, propellant is charged to achieve the desired pressure. The propellant pressure should suffice to enable substantially complete expulsion of the container ingredients through the aerosol valve as a spray. In general, it is found that from about 5 to 50% and preferably about 5 to 15% by weight of the propellant suffices at ambient temperatures. Any of a wide variety of propellants may be used including, without limitation, liquefied propellant gases such as hydrocarbons eg., isobutane, n-butane, propane etc.; halogenated hydrocarbons such as difluoroethane, difluoropropylene, hexafluoropropylene, tetrafluoropropylene, triflouroethane, pentafluoropropylene, tetrafluoroethane, pentafluoroethane, tetrafluoromethane, hexafluoroethane, trichlorofluoromethane (Freon 11), dichlorodifluoromethane (Freon 12), dichlorotetrafluoromethane (Freon 114) and the like. Mixtures of halogenated hydrocarbon and hydrocarbon may also be used, eg., Freon 12 and isobutane as well as compressed gases.

The composition, provided as described, may be applied to a variety of hard surfaces to give continuous glossy and spotfree surface. Surfaces to be treated include finished wood having a stained lacquered finish such as furniture and wood panelling, unlacquered wood, metal, painted, lacquered metal and the like, eg., automobiles, metal furniture or outdoors or indoors use etc. In preparing polishes for metal surfaces it is recommended to include from about 0.2 to 2.0% by weight of amine functional silicone which increases resistance of the applied coating to detergents. Surfaces likely to be exposed to a variety of weather conditions, e.g., automobiles, outdoor furniture and the like are effectively protected by the compositions described herein, which display excellent resistance to dust collection, water, sun rays and the like. When the composition is provided in non-aerosol form, it may be applied to the surface using a soft cloth such as flannel cloth or other applicator and then wiped to form an effective protective coating with minimum effort.

The final emulsion comprises a continuous solvent phase containing the silicone, oil etc., i.e., all oil soluble or dispersible ingredients, and a discontinuous water phase containing emulsified wax as well as water soluble or dispersible ingredients such as surfactant. Ingredients of an optional nature are added to the phase portion in which they are soluble or dispersible.

The following examples will serve to illustrate the present invention without being deemed limitative thereof. Parts where used are by weight unless otherwise indicated.

EXAMPLE 1

A wax emulsion (B) having the following composition:

|  | % |
| --- | --- |
| Carnauba wax | 4.2 |
| Montan E Wax | 5.5 |
| Tween 80* | 3.0 |
| Formalin | 1.0 |
| Deionized H$_2$O | 86.3 |
|  | 100.0 |

*Sorbitan monooleate, ethoxylated (20 E.O.) available commercially from the I.C.I. Corp.

is prepared by heating the wax and emulsifier components in a stainless steel jacketed tank (bottom dish of the tank also jacketed) equipped with a higher shear agitator blade. When the waxes have melted and the temperature reaches about 200° F. water heated to about 200° F. is added beneath the level of the wax mixture via downsprout means. When water addition is completed, the heat source (steam) is isolated and the tank ingredients are allowed to cool. When the temperature of the emulsified tank mixture reaches about 90° F., a small amount (0.2%) of preservative is added. The mixture is allowed to cool to room temperature. Agitation is supplied throughout the entire process.

Wax emulsion (B) at room temperature is thereafter added to a pre-prepared solvent mixture of oil in water emulsifier, silicone and isoparaffinic solvent also at room temperature to yield the following composition:

|  | % |
| --- | --- |
| Isoparaffinic Solvent* | 27.6 |
| Sorbitan sesquioleate** | 0.5 |
| Silicone 500 cps (Dimethylsiloxane) | 1.4 |
| Silicone 1000 cps (Dimethylsiloxane) | 1.4 |
| Wax emulsion (B) | 10.0 |
| Deionized H$_2$O | 58.6 |
| Perfume | 0.5 |

*Isopar C available commercially from the Exxon Corp.
**Arlacel 83 available commercially from I.C.I. America (viscosity = 15.00 cs.)

Agitation is maintained throughout the addition of all ingredients. Formation of the double emulsion commences substantially immediately upon the introduction of wax emulsion (B). When viewed under 900 x magnification, the particle size of the waxes in the finished double emulsion is undetectable.

A portion of the composition is incorporated in an aerosol container, the composition constituting about (92%) by weight of the contents of the container, the remaining (8%) consisting of liquefied propellant such as described previously. The material is sprayed on four wood specimens having different surfaces: (1) varnished, (2) lacquered, (3) painted, and (4) uncoated. In each instance, the composition is spread easily uniformly, dries quickly and is easily buffed with a flannel cloth to provide a smear-free, non-flammable, high gloss, hard, durable water-repellant finish highly resistant to lint and dust collection, and environmental effects such as heat and moisture. The applied coating has a pleasant, non-greasy "feel", smooth to the touch. When compared with known compositions, not only are the aforementioned properties improved, but moreover, are retained for a longer period of time. The apparent depth of the finish is enhanced while the grainy character of the wood specimen is highlighted to an exceptional extent. There is no evidence of wax agglomeration.

The aforedescribed improvements are even more evident when the wood surface to be treated is cleaned with soap and water or wiped with solvent prior to applying the composition.

Testing is continued until the contents of the aerosol container are substantially completely exhausted. At no time is there any indication of orefice clogging despite extended standing periods between uses.

EXAMPLE 2

Example 1 is repeated except that the wax emulsion (B) has the following composition:

|  | % |
| --- | --- |
| Carnauba Wax | 4.2 |
| Montan E Wax | 5.5 |
| Oleic Acid | 1.5 |
| Morpholine | 2.0 |
| Formalin | 1.0 |
| Deionized H$_2$O | 85.8 |
|  | 100.0 |

The results obtained are similar to those described in Example I.

EXAMPLE 3

Example 1 is repeated except that wax emulsion (A) has the following composition:

| | % |
|---|---|
| Hoechst Wax | 5.7 |
| Carnauba Wax | 5.0 |
| Polysorbate 80 | 3.0 |
| Formalin | 1.0 |
| Deionized H₂O | 85.3 |
| | 100.0 |

The results obtained are similar to those of Example 1.

EXAMPLE 4

Example 1 is repeated except that the ingredients are varied as follows. All percentages unless otherwise indicated are based upon final double emulsion product.

a. silicone blend of Example 1 is replaced with:

| | % |
|---|---|
| dimethyl polysiloxane (10000) cs | 2.0 |
| dimethyl polysiloxane (100 cs) | 1.0 | b. The preservative added upon cooling the wax emulsion (B) to about 90° F is 1, 1-methylene is [3-3-(hydroxymethyl) 2, 4 dioxo-5-imidazolidinyl'] area available commercially from the Sulton Laboratories under the trade name designation Germall 115. About .05% of preservative is added.

c. silicone blend of Example 1 is replaced with:

| | % |
|---|---|
| dimethyl polysiloxane (350 cs) | .92 |
| dimethyl polysiloxane (1000 cs) | .92 | d. The wax blend of Example is replaced with:

| | % |
|---|---|
| Hoechst Wax F | 2.0 |
| Hoechst Wax KSS | 2.0 | e. silicone blend of Example 1 is replaced with:

| | % |
|---|---|
| dimethyl polysiloxane (500 cs) | .59 |
| dimethyl polysiloxane (1000 cs) | .39 |
| *Dow Corning XF-13-595 Silicone | 1.82 |

*Amine functional dimethyl polysiloxane

To allow for variation in concentration of preservative, silicone and wax as described, corresponding adjustments are made in water and/or solvent concentration.

EXAMPLE 5

Example 1 is repeated except that the water in oil emulsifier, sorbitan sesquioleate, is replaced in equivalent amounts with the following:
 a. Monamid 908 a tall oil alkanolamide available commercially from Mona, Ind.
 b. Polyglyceroleate, reaction product of morpholine-2-amino-2-methyl-1-propanol and oleic acid
 c. Polyglyceroleate, reaction product of methoxypropylamine and montanic acid Similar results are obtained when one or more water soluble organic detergents e.g. nonionic, cationic etc. and/or water soluble soaps as hereinbefore described are enclued in total amount of from about 0.5-3% by weight of product double emulsion. The detergent component is desirably added as an ingredient of wax emulsion (B) being soluble in the continuous aqueous phase.

EXAMPLE 6

Example is repeated additionally including in the solvent phase composition about 0-5% of a finely divided silica abrasive.

In each of the foregoing examples, the product double emulsion provides excellent results and especially with regard to the elimination of smearing and wax agglomeration. Similar improvement is noted when the concentrations of the involved ingredients are varied within the ranges hereinbefore defined.

What is claimed is:

1. A process for the preparation of a stable water-in-oil double emulsion useful for treating hard surfaces which comprises intimately mixing
    A. a homogeneous organic solvent solution comprising (1) from about 0.05 to 9% of organopolysiloxane having a viscosity of from about 20 to 15,000 centistokes, (2) from about 5 to 50% of organic solvent having an aniline point of from about −22° to 185° F and a distillation range of from about 190° to 460° F, said solvent being substantially completely miscible with said organopolysiloxane and (3) an effective amount of water-in-oil emulsifier, the concentration being based upon final product emulsion
with
    B. an oil-in-water emulsion composition comprising as the discontinuous phase, wax particles having a particle size of from about 0.1 to 5 μ substantially uniformly dispersed throughout a continuous aqueous phase, the concentration of wax in said oil-in-water emulsion being from about 1 to 50%,
whereby to form a water-in-oil emulsion composition wherein (A) forms the continuous phase and (B) forms the discontinuous phase, the latter comprising dispersed aqueous particles containing said wax uniformly dispersed therein and wherein the proportions of (A) and (B) are such as to provide a total wax concentration in the final product of from about 0.1 and 5%.

2. A process according to claim 1 wherein said water in oil emulsifier is sorbitan sesquioleate.

3. A process according to claim 1 wherein the concentration of water-in-oil emulsifier is from about 0.25 to 8%.

4. A process according to claim 1 wherein said wax comprises from about 0.05 to 2.5% of carnauba wax and from about 0.05 to 2.5% of mantan ester wax.

5. A process according to claim 1 wherein an effective amount of perservative is present in said oil-in-water emulsion (B).

6. A process according to claim 1 wherein said organopolysiloxane is polydimethylsiloxane.

7. A process according to claim 1 wherein said oil in water emulsion (B) is prepared by adding aqueous media heated to a temperature of from 190° F to 210°

F to a molten mixture of said wax containing an effective amount of oil-in-water emulsifier, agitation being supplied throughout the addition of aqueous media.

8. A process according to claim 7 wherein an effective amount of perservative is added to said water-in-oil emulsion after cooling same to about 90° F.

9. A process according to claim 7 wherein said aqueous media contains from about 0.5 to 3% by weight of final double emulsion of water-soluble organic detergent.

10. A water-in-oil double emulsion useful for treating hard surfaces having as the continuous phase a homogeneous organic solvent solution comprising (1) from about 0.05 to 9% of organopolysiloxane having a viscosity of from about 20 to 15,000 centistokes, (2) from about 5 to 50% or organic solvent having an aniline point of from about −22 to 185° F and a distillation range of from about 190° to 460° F, said solvent being substantially completely miscible with said organopolysiloxane and (3) an effective amount of water-in-oil emulsifier, the concentration being based upon final product emulsion and having as the discontinuous phase uniformly dispersed aqueous particles, said aqueous particles having uniformly dispersed therein particles of wax having a particle size of from about 0.1 to 5 $\mu$, the concentration of wax in said double emulsion composition being from about 0.1 to 5%.

11. A composition according to claim 10 additionally containing an effective amount of perfume.

12. A composition according to claim 10 additionally containing an effective amount of perservative.

13. A composition according to claim 10 wherein said organopolysiloxane is dimethylpolysiloxane.

14. A composition according to claim 10 wherein said emulsifier is sorbitan sesquioleate.

15. A composition according to claim 10 wherein said wax is from about 0.05 to 2.5% carnauba wax and from about 0.05 to 2.5% of montan ester wax.

16. The composition of claim 10 in the form of a self spraying composition in an aerosol container, said composition comprising from about 50 to 95% of the container contents, the remainder being propellant.

17. The composition of claim 10 wherein there is present from 0.05 to 2.5% of an oil-in-water emulsifier.

18. A composition obtained in accordance with the process of claim 1.

19. A composition according to claim 10 in the form of a semi-solid, viscous paste.

20. A composition according to claim 10 in the form of a relatively non-viscous liquid.

21. A water-in-oil double emulsion useful for treating hard surfaces having as the continuous phase a homogeneous organic solvent solution comprising (1) from about 0.05 to 9% of organopolysiloxane blend of (a) organopolysiloxane having a viscosity at 25° C of from about 50 to 550 centistokes and (b) organopolysiloxane having a viscosity at 25° C of from about 950 to 15,000 centistokes, (2) from about 5 to 50% of organic solvent having an aniline point of from about −22 to 185° F and a distillation range of from about 190° F to 460° F said solvent being substantially completely miscible with said organopolysiloxane and wherein at least about 50% of said solvent comprises isoparaffinic hydrocarbon solvent having an initial boiling point of 190°–210° F, (3) from about .25 to 8% of water-in-oil emulsifier the concentration being based upon final product emulsion and having as the discontinuous phase uniformly dispersed aqueous particles having uniformly dispersed therein particles of wax having a particle size of from about .1 to 5M, the concentration of wax in said double emulsion being from about .1 to 5%.

* * * * *